United States Patent [19]

Sergent

[11] 4,266,582
[45] May 12, 1981

[54] TANK FILLING LIMITER
[75] Inventor: André Sergent, Paris, France
[73] Assignee: Petit & Cie, France
[21] Appl. No.: 77,457
[22] Filed: Sep. 20, 1979
[30] Foreign Application Priority Data
Sep. 28, 1978 [FR] France .............................. 78 27802
[51] Int. Cl.³ .............................................. B65B 3/26
[52] U.S. Cl. .................................. 141/198; 137/423; 251/38
[58] Field of Search ............... 137/423, 413, 221, 222, 137/628; 251/38, 230; 222/68; 141/192–229, 94, 95, 96; 4/324–327

[56] References Cited

U.S. PATENT DOCUMENTS

4,175,296  11/1979  Goldman ............................ 137/423

FOREIGN PATENT DOCUMENTS

2288704  10/1974  France .

Primary Examiner—Houston S. Bell
Attorney, Agent, or Firm—Karl W. Flocks

[57] ABSTRACT

A limiter for the filling of a tank with any liquid, comprising a hydraulic valve provided with a monitoring obturator connected to a first arm with a first float included in an arm-control assembly of which a second arm with a second float cooperates with said first arm through a stop and pawl arrangement, the position of the first arm controlling said obturator, the latter comprising a diaphragm acting as well under an impulse from said first arm as by a permanent action. The limiter provides for safe filling of a tank between predetermined levels without any water-hammer and overflow.

5 Claims, 6 Drawing Figures

TANK FILLING LIMITER

BACKGROUND OF THE INVENTION

The present invention relates to a limiter for the filling of a tank with any liquid, comprising a hydraulic valve associated with a control and monitoring unit for said valve. Such a limiter may, for example, be mounted permanently on a tank for liquid and permit the filling of this tank up to a predetermined first level, then the stopping of the delivery whilst purging the feed pipe in order to stop the delivery positively at a predetermined second level.

Such limiters have already been proposed but these, apart from their frequent difficulty of installation, their complexity and their sometimes unstable adjustment, do not insure constancy of levels, slow down the delivery rate before the first level and prolong the delivery time whilst being incapable of avoiding the water-hammer phenomenon on closing. Such limiters also show considerable pressure drops and the purging of the feed pipe is difficult, even impossible, by pumping.

SUMMARY OF THE INVENTION

It is an object of the present invention to overcome these drawbacks by providing a simple and reliable filling limiter, comprising a monitoring device for a hydraulic valve by means of which the constancy of the levels is insured, does not retard the delivery before the first level whilst it effects sudden cut-off with damping of the water-hammer. In addition, the limiter according to the invention makes possible the purging of the feed pipe, for example, a flexible pipe, by gravity as well as by pumping.

The limiter according to the invention, of the type comprising a hydraulic valve and a monitoring float, is essentially characterized by the fact that it comprises, on the one hand, an assembly of a first and a second pivoting arm each provided with a float, of which the first is connected to the control member of the hydraulic valve, these two arms cooperating through a stop and pawl arrangement and, on the other hand, an obturator designed to control the hydraulic valve constituting the control member of the latter and whose position is associated with that of the first arm.

According to another characteristic, the hydraulic valve, comprising a body with a flange for coupling to the feed pipe, a cylinder and a movable piston bearing on a seating extended by a dip tube arranged in the tank, comprises an obturator constituted by a diaphragm cap with elastic return urging it into open position, whose downstream side includes a needle valve for placing an inner cavity of the piston and the tank in communication through a first passage and a second passage for placing said tank and the downstream cavity of the cap in communication, the latter being mounted on a rod, itself bearing at its end opposite the needle valve on a control flap associated with a first pivoting arm.

BRIEF DESCRIPTION OF THE DRAWINGS

Other features and advantages of the present invention will emerge better from the description which follows, with reference to the appended drawings on which.

In these Figures, the same reference denote the same elements.

DESCRIPTION OF THE PREFERRED EMBODIMENTS

Figure 1:
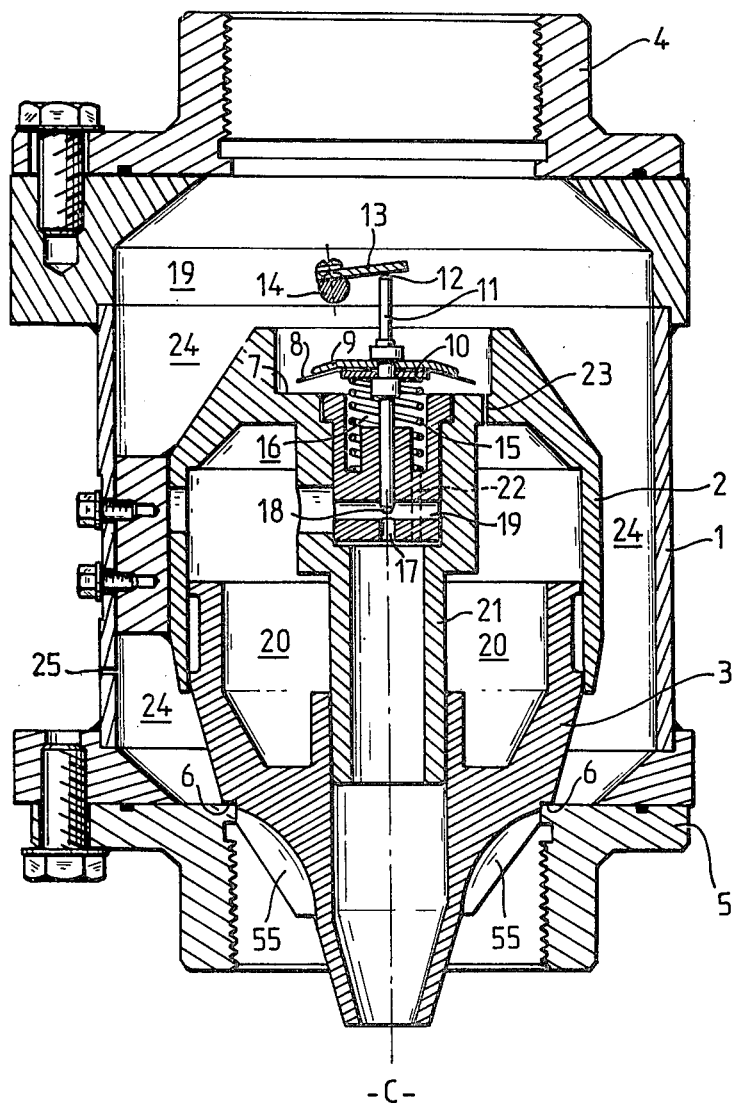
FIG. 1 shows a sectional view of the arrangement of the hydraulic valve of a filling limiter according to the invention.

Referring to FIG. 1, the hydraulic valve is included in a body 1 forming the limiter proper according to the invention. This limiter comprises a fixed cylinder 2 in which a piston 3 can slide. The body 1 includes two flanges 4 and 5, the upstream flange 4 being designed for the fastening of the limiter, placed inside the tak (not shown in this Figure), in the piping coming from the filling nozzle. The downstream flange 5 is designed for fixing a dip tube inside the tank and, at the same time, constituting the seat 6 of the piston 3.

The upper part of the cylinder 2 includes a housing for an obturator which will be described in more detail below. The housing includes, at its upstream upper part, a flat surface 7 forming the seat of a flexible diaphragm 8 included in the movable cap formed by two discs 9 and 10 which grip the diaphragm. These two discs are fixed on an axial rod 11 whose upstream upper end 12 is supported on small plate 13 rotatably mounted on a control axle 14 perpendicular to the axis of the rod 11. The rod 11 is mounted with elastic return by means of a spring 15 arranged in a downstream cavity 16 of the diaphragm 8, the cavity 16 being terminated on the downstream side by an orifice 17 which can itself be obturated by a needle valve 18 formed on the second end of the rod 11. The orifice 17 itself opens into a transverse channel 19. The piston 3 is hollow and defines an inner cavity 20 in cylinder 2 and it is notably mounted to slide around a skirt 21 of the cylinder, which permits the orifice 17 to place the cavity 20 and the tank C in communication through the channel 19. In addition, the bottom of the downstream cavity 16 includes a passage 22 placing the tank C and the said downstream cavity 16 in communication. In addition, the flat surface 7 forming a seating for the diaphragm 8 comprises, outside the area supporting said diaphragm, an orifice 23 of diameter less than that of orifice 17 and placing the inner cavity 20 in communication with the inlet of the limiter defined by the flange 4 and forming an inlet cavity 24. Finally, a small orifice 25 traverses the wall of the body 1 and places the inner cavity 20 in communication with the tank C.

Figure 2:
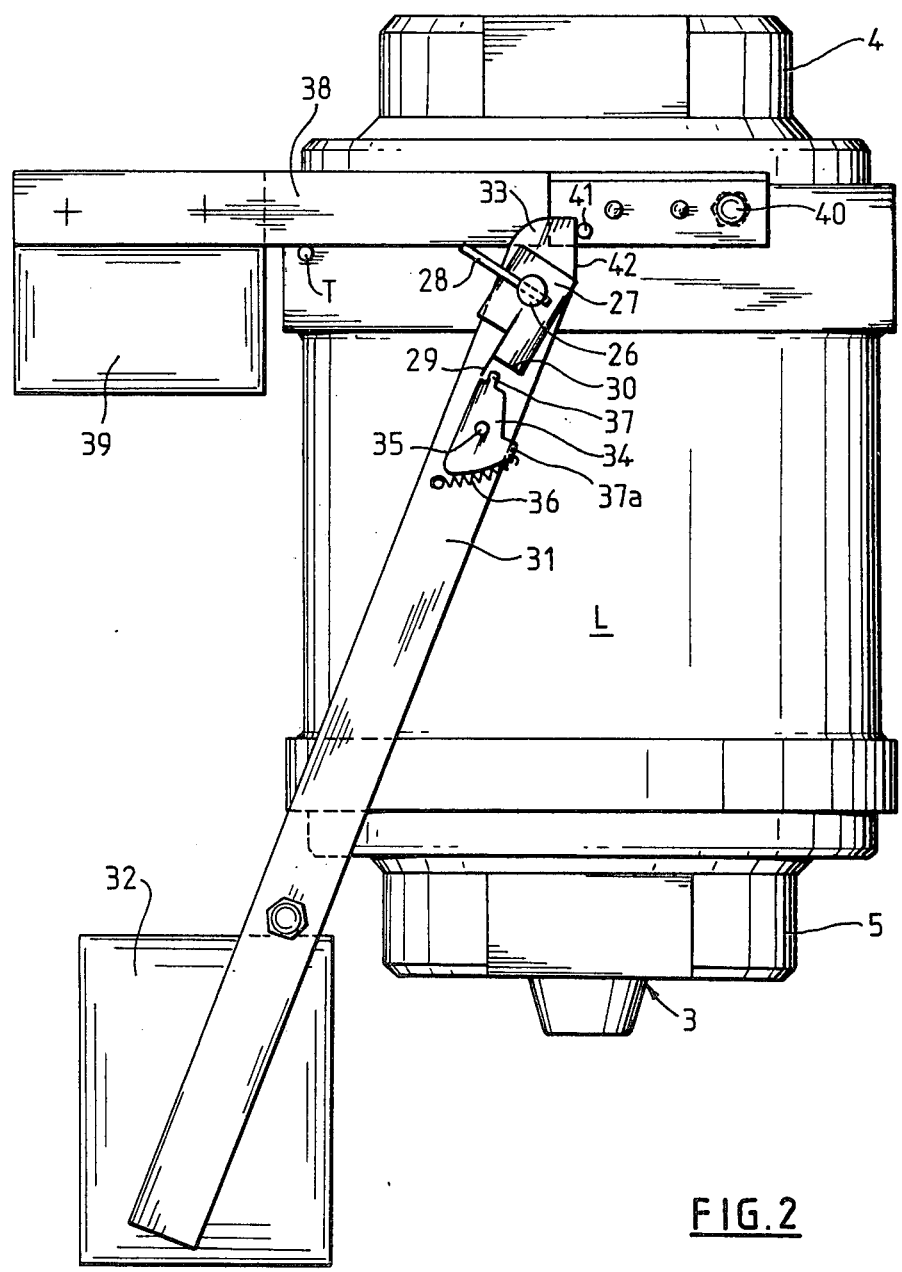
FIG. 2 shows a diagrammatic view of the assembly of pivoting arms in a filling position.
Figure 3:
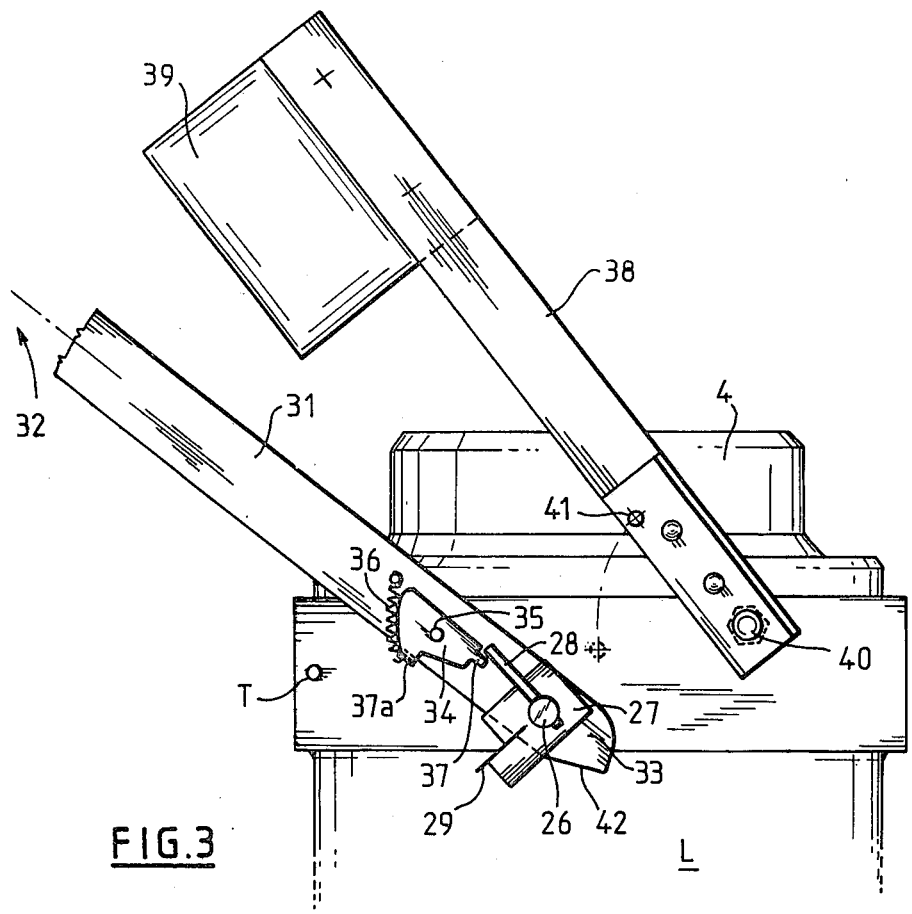
FIG. 3 shows a diagrammatic view of the assembly of FIG. 2 in the end of the filling position.

Referring to FIG. 2, the pivoting arm assembly associated with the obturator of the limiter is arranged around a main axle 26. In a first embodiment, this axle may be the axle 14 of the limiter (L) according to FIG. 1, fast to the flap 13. As will be explained in more detail below, the axle 26 may however be distant from the axle 14 and be coupled to it by any suitable connection capable of transmitting rotary movement.

On the axle 26 is fixed a part 27 comprising a stop 28 and, substantially perpendicular to the latter, a flat spring 29 whose edge projects with respect to the end 30 of said part. A first arm 31 bearing a first float 32 is mounted to pivot freely around the axle 26. This arm includes at its end opposite the float 32 a cam 33. At the same end, the arm 31 also includes a pawl 34 pivoting around an axle 35 perpendicular to the arm, with elastic return by means of a spring 36 which urges it so that it is stopped in its rotation by an abutment 37a which can be supported on the edge of the arm 31. The pawl 34 also comprises on its edge opposite the spring 36 a finger 37 which can be supported on the projecting part of the spring 29.

The pivoting arm assembly also includes a second arm 38 bearing a second float 39 and pivotable around an axle 40 parallel to the axle 26 and spaced from the latter so that a peg 41 borne by this arm in the vicinity of the axle 40 constitutes a stop for a flat 42 of the cam 33 of the first arm 31. The arm 38 normally rests on a bracket T.

Figure 5:
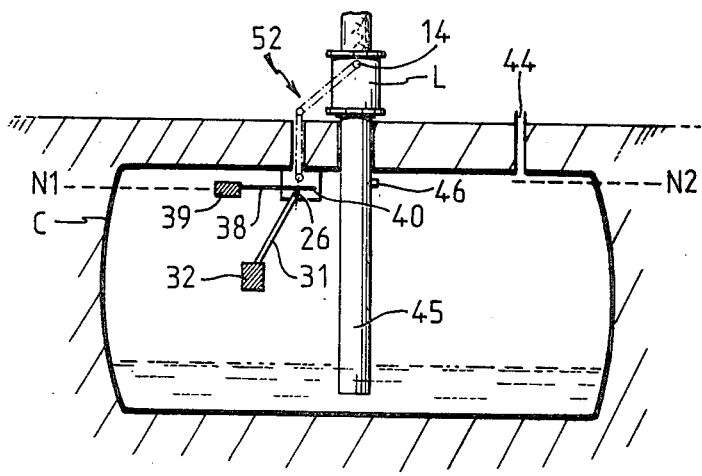
FIG. 5 shows a diagrammatic view of an embodiment according to the invention in which the assembly of pivoting arms is distant with respect to the hydraulic valve.

Referring to FIG. 5, the limiter L is provided to be mounted on a buried tank C connected to the outside by a pipe 43, itself connected to the flange 4 (FIG. 1). The tank also includes the usual vent 44 whilst a dip tube 45, connected to the downstream flange 5 (FIG. 1), includes a vacuum-breaker hole 46.

For filling the tank, a suitable supply source, for example, a tank truck 47, is connected to the pipe 43 through a valve 48 in its outlet pipe and a flexible pipe 49 bearing two rapid couplings 50 and 51 to connect the tank truck to the tank.

Before starting the delivery, if the liquid in the tank C is at a low level, the float 32 is in a low position, the cam 33 of the arm 31 is supported on the peg 41 of the second arm 38.

The flap 13 is then in upper position, enabling the rod 11 to also be in upper position under the thrust of the spring 15. The orifice 17 is open. When, the flexible tube 49 being connected, the valve 48 of the tank truck is opened, the liquid arrives in the chamber 24. The pressure of the column of liquid is exerted on the outside of the piston 3.

The orifice 17 being opened, the inner cavity 20 of the piston-cylinder assembly is at atmospheric pressure through the vacuum-breaker hole 46 and the vent 44 of the tank.

Under the effect of the difference in pressure, the piston lifts, enabling the passage of liquid into the tank through the downstream flange 5.

If the amount to be delivered is greater than the capacity of the tank, the liquid arrives at the level N1 where it moves the second float 39 upwards. Through this fact, the arm 38 in rising causes the peg 41 to escape from the cam 33; the first float 32 is then released and it is drawn upwards. During this upward movement, the first arm 31 moves the pawl 34. Through this fact, the finger 37 of the pawl is urged on to the spring 29 and therefore rotates the part 27 and hence the control axle 26. The flap 13 then pushes the rod 11 downwards which closes the orifice 17 and the diaphragm 8 is applied to the flat surface 7. The float 32 continuing to rise, the finger 37 of the pawl 34 finishes by escaping from the leaf spring 29 and passes beyond the latter.

When the rod 11 is pushed into low position by the flap 13, under the action of the thrust of the finger 37 on the spring 29, the diaphragm 8 forming a seal on the surface 7, the downstream cavity 16 situated under the diaphragm 8 comes, through the orifice 22, to the downstream pressure of the limiter (internal pressure of the dip tube 45), still less than the upstream pressure (pressure of the cavity 24), due to the fact of the pressure drop due to the flow between the piston 3 and its seat 6.

Although the diaphragm 8 has only received a temporary impulse downwards, as a result of the pressure difference existing between its upper part and its lower part, it remains in sealed contact forming a sucker on the surface 7.

The orifice 17 remaining closed by the needle valve 18, the inner cavity 20 of the piston is then gradually placed at the pressure upstream existing in the cavity 24 through the orifice 23.

The piston then being subjected to the same pressure on its surfaces in contact with the chambers 20 and 24 becomes, through its differences in the surfaces of application, reseated on its seating 6 formed by the flange 5, which stops the flow of liquid.

The delivery operator closes the valve 48 of the truck: this valve being fluid-tight, the slight leakage occuring through the orifice 25 of the body 1 gradually places the feed column under suction. The pressure of the cavity 24 decreases gradually. When the pressure of the cavity 24 is close to the atmospheric pressure, under the action of the spring 15 the diaphragm 8 separates from the surface 7. If the rapid uncoupling device 50 is disconnected from the flexible tube 49, the pressure is reestablished immediately in the cavity 24 of the limiter and the piston rises in exactly the same way as at the beginning of the delivery thus enabling the purging of the flexible tube 49. It should be noted that if the delivery is effected through a pump, the operation of purging the flexible pipe can be carried out in exactly the same manner at the maximum delivery rate of the pump which presents a considerable advantage of the device according to the invention. In the case where the volume in a flexible pipe would be greater than the volume reserved in the upper portion of the tank or in the case of any false manoeuver (erroneous delivery for example), the liquid arriving at the upper level N2 would move the float 32 into a position where the finger 37 of the pawl would become thrust onto the stop 28, the latter moving the axle 26 and hence the flap 13 downwards. The flap 13 moving the rod 11 downwards could then become, through the same process as at level N1, the cause of the descent of the piston and, for the same reason, of the stopping of the flow of the liquid.

In this case nonetheless, the thrust of the finger 37 on the stop 28 remaining permanent, the rod 11 would remain in lower position, this resulting in the final stopping of the flow of liquid.

When the level drops in the tank as a result of the consumption of the liquid, the float 32 redescends following the level of the liquid. The finger 37 then comes into contact with the spring 29, which results in the pivoting of the pawl 34 until the moment when the finger 37 escapes from the spring 29. The float 32 continues to descent until the cam 33 of the first arm 31 becomes reengaged against the peg 41. The limiter is then again in its initial position.

Referring to FIG. 5, for reasons of installation, it is possible in certain cases to be advantageous to place the limiter not below the manhole of the tank but above. In this case, it is possible without difficulty to separate the hydraulic valve from its pivoting arm-control assembly. The whole of the assembly for controlling the valve through the level of the liquid is in fact effected through the part 27 fixed to the axle 26. As mentioned above, it is of course obvious that the part 27 could communicate its movement to the axle 14 of the limiter without being fixed directly above (that is to say, axles 14 and 26 merged), but through any suitable mechanical or hydraulic linkage 52. It may hence be perfectly well contemplated to dissociate the float-control assembly from the hydraulic valve and thus to construct various types of mounting the assembly by known connecting means such as a cable in a sheath, a hydraulic piping, linkrods, etc.

Figure 6:
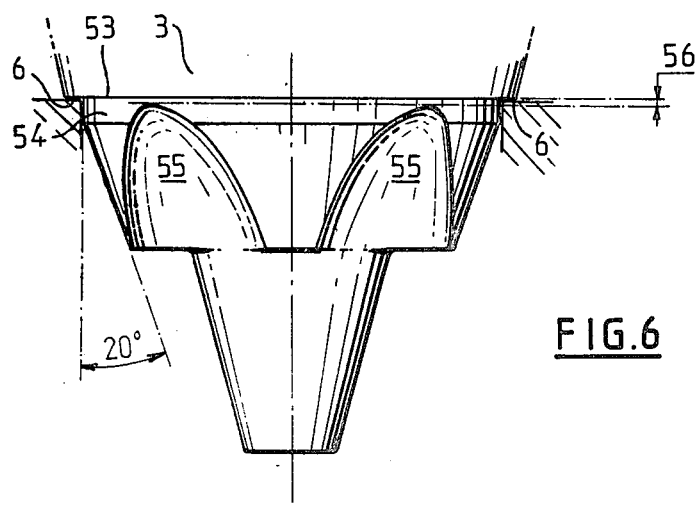
FIG. 6 shows a diagrammatic view of an advantageous embodiment of the lower portion of the piston of the hydraulic valve.
Figure 4:
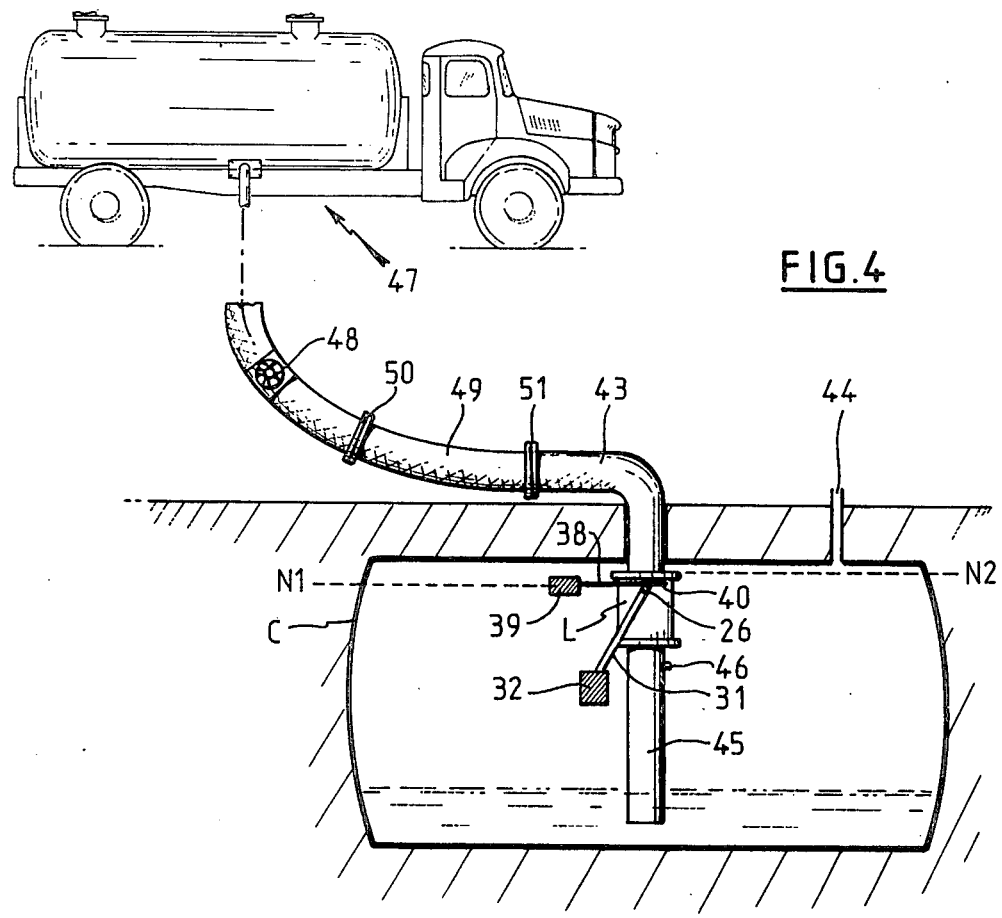
FIG. 4 shows a diagrammatic view illustrating the operation of the device according to the invention.

As mentioned above, the limiter which can be constructed according to the invention has the advantage notably of enabling distinct cut-off of the supply without slowing down before the predetermined level whilst damping or eliminating the water-hammer. Referring to FIG. 6, this effect is obtained by means of the particular shape of the lower portion of the piston 3. This portion is cylindro-conic, of an angle advantageously of the order of 20° beyond the flat peripheral area 53 designed to bear on the seat 6 and a cylindrical area 54. The lateral surface of this conical portion includes also substantially spherical surfaces 55 whose upper portion, in the vicinity of zone 53, leaves a cylindrical clearance of slight height 56. Due to this arrangement, the shape of the surface 55 on the downward movement of the piston results in a gradual drawing out of the liquid vein and damps or entirely suppresses the water-hammer.

The filling limiter according to the invention is applicable to the delivery of any liquid into tanks with full safety as regards leakages and overflows, notably due to the monitoring of the hydraulic valve by the opening or closing of the obturator, the obturation taking place through the diaphragm forming a sucker and controlled as much by an impulse as by a permanent action.

It is of course understood that the present invention has only been described and illustrated by way of explanation but not in any limiting manner and that any modification could be introduced therein within the field the technical equivalents without departing from its scope.

What is claimed is:

1. A limiter for the filling of a tank with liquid, mounted in said tank, comprising:
   a hydraulic valve provided with a monitoring obturator means having a control flap and a control axle connected to a first pivoting arm having a first float included in an arm-control assembly;
   a second pivoting arm having a second float and a peg cooperating with a cam disposed at the end of said first arm opposite said first float;
   a fixed member on said control axle comprising a stop and pawl arrangement with a perpendicular flat spring urging a finger disposed on said pawl and pivoting onto said second arm, said finger being in escaping relationship with respect to said flat spring;
   said hydraulic valve comprising a body provided with an inlet flange and an outlet flange, a cylinder and a movable piston provided with an inner cavity and bearing on a seating disposed at the vicinity of said outlet flange;
   and means for placing said inner cavity and the downstream side of said obturator means in communication with said tank.

2. A limiter according to claim 1 in which said movable piston bears on a seating extended through a dip tube arranged in the tank and the obturator means is constituted by a diaphragm cap with elastic return urging it into open position, of which the downstream side includes a needle valve in a first passage for placing the inner cavity of the piston in communication with the tank through a first channel, said obturator means comprising a second passage for placing said tank and said downstream cavity of the cap in communication, the latter being mounted on a rod itself bearing at its end opposite the needle valve on said control flap of said obturator associated with said first pivoting arm.

3. A limiter according to claim 1 in which said stop and pawl arrangement comprises the cam at the end of the first arm which can come into abutment on a peg borne by the second arm, the member fast to the axle of said first arm and provided with a stop and with the flat spring on which is supported with possible passage past it a finger of the pawl, itself with an elastic return limited by a stop supported on an edge of said first arm, the finger being contactible with the stop of the member fast to said axle after passage past said flat spring on the rise of the second arm under the action of the second float.

4. A limiter according to claim 1 in which the control flap of the obturator of the hydraulic valve associated with the first pivoting arm is fast to the pivoting axle of the first arm and on which is fixed the part cooperating with the pawl.

5. A limiter according to claim 1 in which the obturator control flap of the hydraulic valve is associated with the first pivoting arm through a linkage capable of transmitting a rotary movement of the axle of said flap, the hydraulic valve being distant from the pivoting arm-control assembly.

* * * * *